United States Patent [19]

Griffioen

[11] Patent Number: 5,466,973
[45] Date of Patent: Nov. 14, 1995

[54] DELIVERY POINT VOLTAGE REGULATION IN ELECTRIC ENERGY DISTRIBUTION NETWORKS

[75] Inventor: Jan H. Griffioen, Pijnacker, Netherlands

[73] Assignee: N.V. Geb Zuid-Holland West, The Hauge, Netherlands

[21] Appl. No.: 54,613

[22] Filed: Apr. 29, 1993

[30] Foreign Application Priority Data

Apr. 29, 1992 [NL] Netherlands ............................ 9200783

[51] Int. Cl.⁶ ........................................................ H02J 3/00
[52] U.S. Cl. ............................. 307/17; 323/255; 323/342
[58] Field of Search ....................... 307/17, 42; 323/255, 323/256, 264, 340, 341, 342, 347

[56] References Cited

U.S. PATENT DOCUMENTS 4,471,231  9/1984  Minimi ........................................ 307/17

OTHER PUBLICATIONS

Wheeler, P. L. et al. "The Effect of Voltage Reduction on Distribution System Loads", *IEEE paper A 78 542–3*. Submitted Feb. 2, 1978: made available for printing Apr. 25, 1978.

Erickson, J. C. et al., "The Effects of Voltage Reduction on Distribution Circuit Loads. *IEEE Transactions on Power Apparatus and System*", vol. PAS–101, No. 7, Jul., 1982 pp. 2014–2018.

Kennedy, B. W. et al. "Conversation Voltage Reduction (CVR) at Snohomisch County PUD" *IEEE Transactions on Power Systems*, vol. 6, No. 3, Aug., 1991, pp. 986–998.

"Voltage Ratings for Electric Power Systems and Equipment (60 Hz), American National Standards Institute", New York, Standard No. C84.1–1989.

Clark, E. H. "Voltage Reduction for Energy Reduction", *EEI T&D Committee Meeting*, Portland, Oreg., May 17, 1979.

Pazuik, L. A., et al. "An Expert Microprocessor Controlled Voltage Regulator . . . " *IEEE Transactions on Power Delivery*, vol. 4, Oct. 1989, pp. 2222–2228.

Taylor, C. W. "Solving Bulk Transmission System . . . " *Third International Symposium on Distribution Automation and Demand Side Management Conference Proceedings*, Jan. 11–13, 1993, pp. 486–494.

*Primary Examiner*—Jeffrey L. Sterrett
*Attorney, Agent, or Firm*—Ladas & Parry

[57] ABSTRACT

A method for regulating the voltage at which electric energy is supplied at the delivery points in a network for distributing electricity. The voltage of electric energy supplied through a high-voltage network is reduced to a voltage suitable for a medium-voltage network by means of at least one variable transformer. The voltage of the electric energy in the medium-voltage network is reduced, by means of at least one transformer, to a voltage suitable for a low-voltage network supplying the electric energy to the consumers. The adjustment of the variable transformer between a high-voltage network and a medium-voltage network is influenced by the actual voltage measured and the current or load at the output side of the variable transformer. The voltage prevailing at the delivery point is measured at the location of at least a number of consumers and the variable transformer is set partly in dependence on the voltage thus measured at the consumers' location.

7 Claims, 2 Drawing Sheets

DELIVERY POINT VOLTAGE REGULATION IN ELECTRIC ENERGY DISTRIBUTION NETWORKS

FIELD OF THE INVENTION

The invention relates to a method for regulating the voltage at which electric energy is supplied at the delivery points in a network for distributing electricity, whereby the voltage of electric energy supplied through a high-voltage network is reduced to a voltage suitable for a medium-voltage network by means of at least one variable transformer, whilst the voltage of the electric energy in the medium-voltage network is reduced, by means of at least one transformer, to a voltage suitable for a low-voltage network supplying the electric energy to the consumers, whereby the adjustment of the variable transformer between a high-voltage network and a medium-voltage network is influenced by the actual voltage measured and the current or load at the output side of the variable transformer.

DESCRIPTION OF THE PRIOR ART

In the usual electric transmission networks, as diagrammatically shown in FIG. 1, the electric energy is supplied from a power station or the like in a high-voltage network 1. The voltage in such a high-voltage network is usually ±25–50 kV. Said high-voltage network is in many cases comprised of overhead high-voltage cables, whilst in other cases use is also made of underground high-voltage cables. The electric energy thus supplied through high-voltage cables 1 by electricity companies or the like is usually transmitted to the consumers by distribution companies by using a medium-voltage network, in which a considerably lower voltage, generally ±10 KV, is maintained.

For this purpose at least one variable transformer 3 is provided between the high-voltage network 1 and the medium-voltage network 2, so as to convert the voltage of ±25–50 kV in the high-voltage network into a voltage of ±10 kV in the medium-voltage network 2.

The eventual customers or consumers 4 are connected to a low-voltage network 5, in which at present a voltage of ±220 V is maintained in the Netherlands.

This ±220 voltage may be raised to ±230 V in the future, but this is not essential for the present invention. For example, also low-voltage networks in which a voltage of ±110 V is maintained are being used.

The method according to the invention, however, relates to regulating the nominal voltage in the consumer network and the magnitude of said voltage is not essential thereby and is consequently only mentioned by way of example herein.

In order to be able to present electric energy at a voltage of ±220 V to the customers or consumers in the low-voltage network 5, transformers 6 having fixed settings are provided between the medium-voltage network and the low-voltage network, by means of which the voltage of the electric energy supplied through the medium-voltage network 2 for the low-voltage network 5 is reduced to the voltage desired for said low-voltage network.

In order to be able to keep the voltage level constant when the consumption of electric energy varies, the load or current is measured at the output side of the transformer 3 by a measuring means 7. Furthermore, the voltage after the transformer 3 is measured by a further measuring means 8.

The measured load and the measured voltage are supplied to a regulating means 9, by means of which the variable transformer 3 is regulated in dependence on the measured load and the measured voltage, so as to maintain the voltage behind the transformer 3 at a desired constant value as well as possible through a fixedly set regulating curve. The setting of the regulating curve may be influenced by hand, if necessary.

A drawback of this known system is that in this manner it is not possible to ensure that the nominal voltage of the electric energy delivered to the consumers at the delivery point remains constant as much as possible. In practice it has become apparent that the voltage may vary between nominal voltage +10% and nominal voltage −10%. In order to prevent problems the setting of the regulating curve is in practice usually such, that the voltages at the various delivery points at the location of the consumers 4 are on average above the nominal voltage level of for example ±220 V, but this cannot be guaranteed at all times either. When the consumers frequently complain about too low voltages (complain system), the above-mentioned regulating curve is adjusted to maintain the voltage in the medium-voltage net 2 at a slightly higher level.

SUMMARY OF THE INVENTION

The object of the invention is to improve the above-described method in such a manner that the electric energy can be supplied to the customers or consumers 4 at a voltage level that is as optimal as possible. That is, the aim is to realize a dynamic regulation of the voltage at which electric energy is supplied to the consumers at a minimal level in accordance with the terms of delivery.

According to the invention this can be achieved in that the voltage prevailing at the delivery point is measured at the location of at least a number of consumers and that the variable transformer is set also in dependence on the voltage thus measured at the consumers' location.

DESCRIPTION OF THE PREFERRED EMBODIMENT

By using such a method the voltage at the delivery point can be maintained at least substantially at a minimum permitted level, which could lead to an important reduction of the prevailing load and also to a decrease of the consumed energy.

Figure 1:
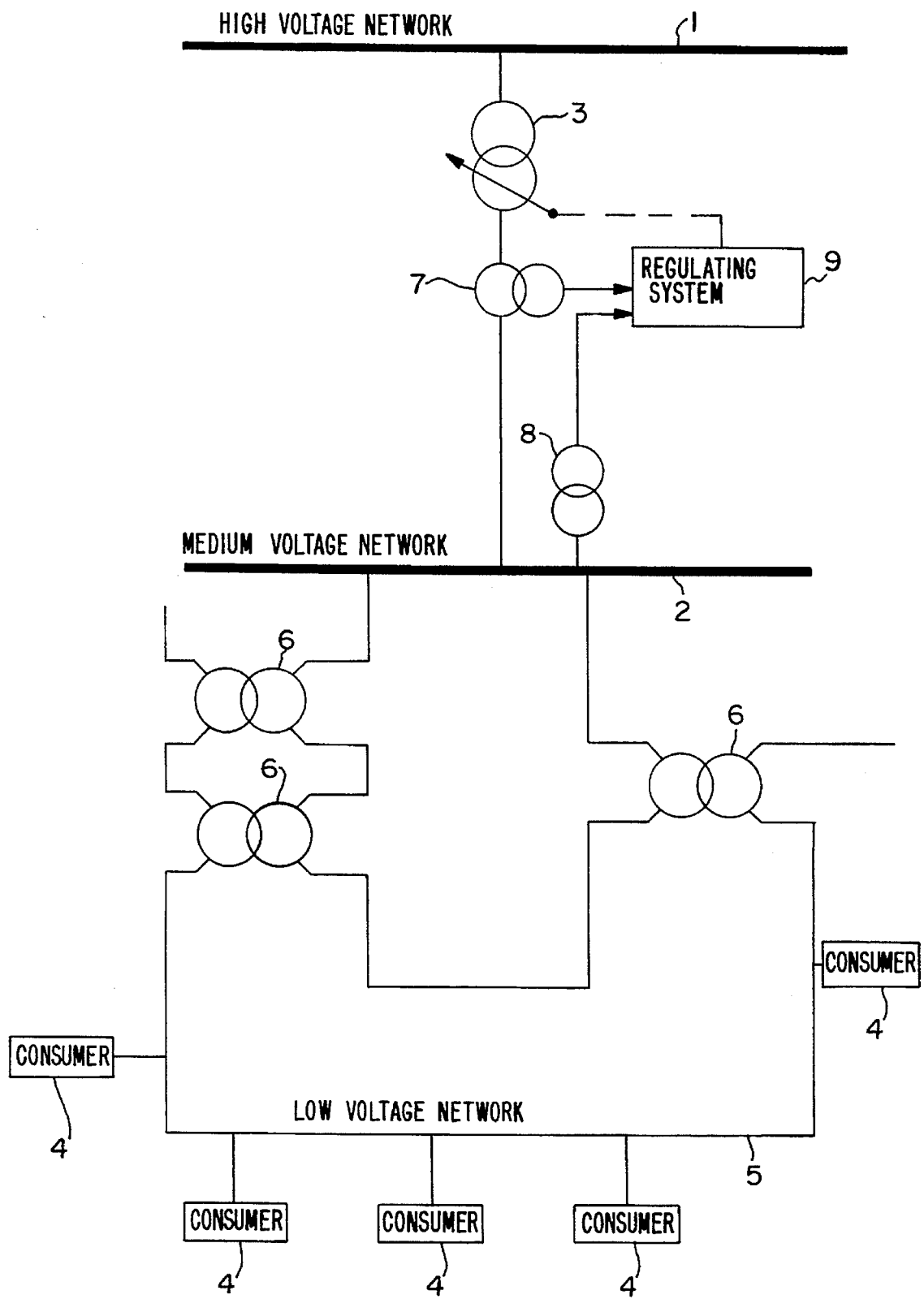
FIG. 1 shows in diagrammatical form an electric transmission network of the Prior Art.
Figure 2:
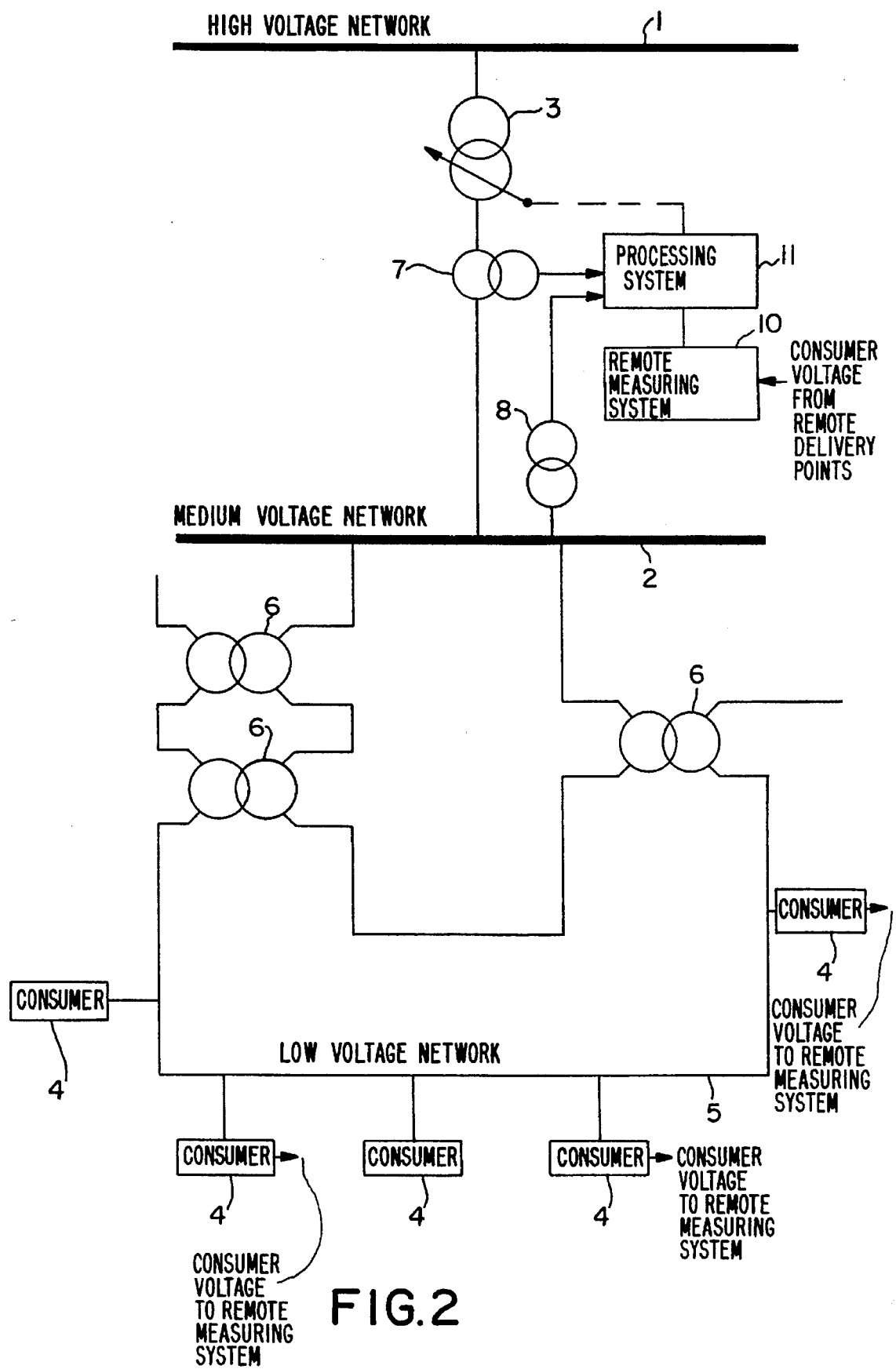
FIG. 2 shows in diagrammatical form an electric transmission network in accordance with the present invention.

The invention will be explained in more detail hereafter with reference to FIG. 2, which diagrammatically shows an electric transmission network according to the invention. Those parts that correspond with the parts of the transmission network shown in FIG. 1 are numbered alike and will not be described again.

When using the method according to the invention the voltage actually prevailing in the consumer network 5 is measured at the location of a large number of randomly selected consumers or delivery points. In practice said measurement takes place after the measuring means for recording the consumption, which is disposed at the delivery point, in accordance with the terms of delivery. Furthermore there may be a delivery point at the location of a large-scale consumer, who is directly connected to the medium-voltage network through his own transformer or the like. The voltages measured at the delivery points are recorded by means of a remote measuring system 10. Said remote measuring may for example take place directly via the network or via separate connections.

The measured voltages are supplied to a processing means 11 by means of the remote measuring system 10, said processing means comprising a computing device for statistically processing the voltages measured at the delivery points, so as to obtain an output signal dependent on the voltages at the delivery points. Said output signal is utilized, together with the signals from the above-mentioned measuring means 7 and 8 likewise supplied to the processing means 11, so as to regulate the voltage in the medium-voltage network and the low-voltage network via the transformer 3, by means of said measuring means 11.

The voltages at the delivery points may be measured continuously at predetermined time intervals of for example ±5 minutes, which measurements may be used for directly regulating the transformer.

Another possibility is to carry out measurements in the delivery points for a predetermined time and to use these measurements to store a certain "regulation curve" or program in the processing means 11, in which the variations in the voltages in the delivery points, which may for example be dependent on the time, the load, the location and the like, are incorporated, and by means of which the transformer 3 is regulated during periods in which no measurements are carried out at the delivery points.

At set intervals the voltages at the delivery points may again be measured for a predetermined time so as to adjust the "regulating curve", which may for example be necessary with the change of the seasons or the like.

By using this regulation it is possible to realize the most optimal voltage that is possible at the delivery points, whereby the deviation from the nominal value that occurs can be considerably smaller than with the method used so far, whereby said deviation may be ±10% of the nominal value, as set forth above.

As a result of this the nominal value can generally be set to a lower voltage than with the method usual so far, which may lead to a reduction in the power taken off.

On the other hand it is better possible to guarantee that the voltage at which the electric energy is supplied satisfies the values mentioned in the terms of delivery, which is of importance in preventing claims for damages from the consumers.

A further advantage of the method according to the invention is that the take-up of energy generated by third parties, such as energy from thermal/power installations, windmills and the like, presents no difficulties. This is in contrast to the method presently used, wherein the take-up of energy supplied by third parties may lead to interference in the regulation of the desired voltages.

I claim:

1. A method for regulating the voltage at which electric energy is supplied at the delivery points in a network for distributing electricity, whereby the voltage of electric energy supplied through a high-voltage network is reduced to a voltage suitable for a medium-voltage network by means of at least one variable transformer, whilst the voltage of the electric energy in the medium-voltage network is reduced, by means of at least one transformer, to a voltage suitable for a low-voltage network supplying the electric energy to the consumers, whereby the adjustment of the variable transformer between a high-voltage network and a medium-voltage network is influenced by the actual voltage measured and the current or load at the output side of the variable transformer, characterized in that the voltage prevailing at the delivery point is measured at the location of at least a number of consumers and that the variable transformer is set also in dependence on the voltage thus measured at the consumers' location.

2. A method according to claim 1, characterized in that the voltage prevailing at the delivery point at the location of a number of randomly selected consumers is measured, and that by statistically processing said measurements an approach is made of the voltage prevailing at the delivery point at the location of all consumers, so as to generate a control signal.

3. A method according to claim 1, characterized in that voltage measurements are carried out continuously at the delivery points, possibly with short interruptions.

4. A method according to claim 1, characterized in that voltage measurements are carried out in the delivery points during a predetermined period, for programming a processing means influencing the variable transformer, by means of which, after the measurements have been stopped, the variable transformer is regulated in accordance with the stored programme.

5. A method according to claim 4, characterized in that said voltage measurements are periodically repeated and that the stored programme is adapted to the new measurements, if necessary.

6. A method according to claim 2, characterized in that voltage measurements are carried out continuously at the delivery points, possibly with short interruptions.

7. A method according to claim 2, characterized in that voltage measurements are carried out in the delivery points during a predetermined period, for programming a processing means influencing the variable transformer, by means of which, after the measurements have been stopped, the variable transformer is regulated in accordance with the stored program.

* * * * *